(12) United States Patent  (10) Patent No.: US 8,712,599 B1
Westpfahl  (45) Date of Patent: Apr. 29, 2014

(54) VEHICLE INERTIAL SENSOR SYSTEMS (71) Applicant: Analog Devices Technology, Hamilton (BM)

(72) Inventor: Michael Westpfahl, Warngau/Wall (DE)

(73) Assignee: Analog Devices Technology, Hamilton (BM)

( * ) Notice: Subject to any disclaimer, the term of this patent is extended or adjusted under 35 U.S.C. 154(b) by 0 days.

(21) Appl. No.: 13/774,152

(22) Filed: Feb. 22, 2013

(51) Int. Cl.
 *G06F 17/00* (2006.01)
(52) U.S. Cl.
 USPC ............................................................. 701/1
(58) Field of Classification Search
 USPC ............................................................. 701/1
 See application file for complete search history.

(56) References Cited

U.S. PATENT DOCUMENTS

| | | | |
|---|---|---|---|
| 5,408,411 A * | 4/1995 | Nakamura et al. | 701/48 |
| 5,878,357 A * | 3/1999 | Sivashankar et al. | 701/1 |
| 6,532,419 B1 * | 3/2003 | Begin et al. | 701/504 |
| 6,829,524 B2 * | 12/2004 | Chee | 701/1 |
| 7,057,503 B2 * | 6/2006 | Watson | 340/440 |
| 7,162,333 B2 * | 1/2007 | Koibuchi et al. | 701/1 |
| 7,502,677 B2 * | 3/2009 | Weichenberger et al. | 701/45 |
| 8,055,423 B2 * | 11/2011 | Hattori et al. | 701/79 |
| 8,121,758 B2 * | 2/2012 | Lu | 701/38 |
| 8,220,330 B2 * | 7/2012 | Miller et al. | 73/514.32 |
| 8,229,639 B2 * | 7/2012 | Craig et al. | 701/70 |
| 2008/0201033 A1 * | 8/2008 | DeMersseman et al. | 701/29 |

* cited by examiner

*Primary Examiner* — Thomas Tarcza
*Assistant Examiner* — Alex C Dunn
(74) *Attorney, Agent, or Firm* — Sunstein Kann Murphy & Timbers LLP (57) ABSTRACT

Integrated crash and vehicle movement sensing by use of distributed new multi-axis satellite sensors combines side and/or front/rear crash sensing with other applications requiring dynamic vehicle movement data like (but not limited to) roll and/or pitch detection as well as active suspension, head light beam leveling, etc. Depending on the required functionality, two or more satellite sensor modules are used, which measure multi-axis high-g and low-g acceleration, without needing any further sensor inputs like gyroscopes while achieving a high level of failsafe and redundancy.

18 Claims, 9 Drawing Sheets

VEHICLE INERTIAL SENSOR SYSTEMS

FIELD OF THE INVENTION

The present invention relates generally to vehicle inertial sensor systems, such as for rollover detection, pitch detection, front and side crash detection, as well as applications like active suspension and head light beam leveling.

BACKGROUND OF THE INVENTION

Today, vehicle rollover detection, pitch detection, front and side crash detection, and other applications such as active suspension and head light beam leveling require different sensor systems (for example a combination of different oriented gyroscopes, different oriented low-g and high-g acceleration sensors), which are distributed throughout the car and placed at different areas. For example, crash detection typically uses high-g satellite sensor modules in vehicle sides and front/rear. Additional roll detection typically uses a gyroscope and potentially an accelerometer in the z-direction. For pitch detection, at least another gyroscope shifted 90 degrees from the roll gyroscope is typically used. Active suspension and head beam leveling, as well as other similar applications, need information about the vehicle chassis movement (tilt, roll or pitch) and typically use low-g accelerometers, which are separately placed, for example, near the wheels for active suspension. Those distributed, separate systems add significant costs and complexity to the vehicle and also add to vehicle weight due to extended wiring harnesses.

SUMMARY OF EXEMPLARY EMBODIMENTS

In one embodiment of the invention there is provided a satellite sensor module for a vehicle sensor system. The satellite sensor module includes a first wide-g horizontal acceleration sensor arranged for sensing accelerations for a first horizontal vehicle axis, a vertical acceleration sensor arranged for sensing accelerations for a vertical vehicle axis, and a local processor in communication with the sensors, the local processor configured to process acceleration information received from the sensor for at least one of vehicle crash, roll, pitch, or yaw detection.

In various alternative embodiments, the first wide-g horizontal acceleration sensor may include separate high-g and low-g horizontal acceleration sensor elements. The first wide-g horizontal acceleration sensor and the vertical acceleration sensor may comprises a high-g horizontal acceleration sensor element and a combination low-g horizontal and vertical acceleration sensor element. The satellite sensor module may further include a second wide-g horizontal acceleration sensor in communication with the local processor and arranged for sensing accelerations for a second horizontal vehicle axis normal to the first horizontal vehicle axis, in which case the first wide-g horizontal acceleration sensor may comprise separate high-g and low-g horizontal acceleration sensor elements and the second wide-g horizontal acceleration sensor may comprise separate high-g and low-g horizontal acceleration sensor elements. The first and second wide-g horizontal acceleration sensors and the vertical acceleration sensor may comprise a first high-g horizontal acceleration sensor element arranged for sensing accelerations for the first horizontal vehicle axis, a second high-g horizontal acceleration sensor element arranged for sensing accelerations for the second horizontal vehicle axis, and a three-axis low-g acceleration sensor element arranged for sensing accelerations for the first horizontal vehicle axis, the second horizontal vehicle axis, and the vertical axis.

In another embodiment of the invention there is provided a vehicle sensor system comprising a front satellite sensor module including a wide-g horizontal acceleration sensor and a vertical acceleration sensor, the wide-g horizontal acceleration sensor arranged for sensing accelerations for a vehicle longitudinal axis; a first side satellite sensor module including a wide-g horizontal acceleration sensor and a vertical acceleration sensor, the wide-g horizontal acceleration sensor arranged for sensing accelerations for a vehicle lateral axis; a second side satellite sensor module including a wide-g horizontal acceleration sensor and a vertical acceleration sensor, the wide-g horizontal acceleration sensor arranged for sensing accelerations for the vehicle lateral axis; and a central processing unit in communication with the satellite sensor modules, the central processing unit configured to process acceleration information received from the satellite sensor modules for at least one of vehicle crash, roll, pitch, or yaw detection.

In various alternative embodiments, the front satellite sensor module may further comprise a second wide-g horizontal acceleration sensor arranged for sensing accelerations for a vehicle lateral axis. Each side satellite sensor module may include a second wide-g horizontal acceleration sensor arranged for sensing accelerations for a vehicle longitudinal axis.

In yet another embodiment of the invention, a vehicle comprises a front satellite sensor module including a wide-g horizontal acceleration sensor and a vertical acceleration sensor, the wide-g horizontal acceleration sensor arranged for sensing accelerations for a vehicle longitudinal axis; a first side satellite sensor module including a wide-g horizontal acceleration sensor and a vertical acceleration sensor, the wide-g horizontal acceleration sensor arranged for sensing accelerations for a vehicle lateral axis; a second side satellite sensor module including a wide-g horizontal acceleration sensor and a vertical acceleration sensor, the wide-g horizontal acceleration sensor arranged for sensing accelerations for the vehicle lateral axis; and a central processing unit in communication with the satellite sensor modules, the central processing unit configured to process acceleration information received from the satellite sensor modules for at least one of vehicle crash, roll, pitch, or yaw detection, wherein the front satellite sensor module is placed toward the front of the vehicle and the side satellite sensor modules are placed opposite one another behind the front satellite sensor module and on opposite sides of the vehicle longitudinal axis.

In various alternative embodiments, the front satellite sensor module may further comprise a second wide-g horizontal acceleration sensor arranged for sensing accelerations for a vehicle lateral axis. Each side satellite sensor module may include a second wide-g horizontal acceleration sensor arranged for sensing accelerations for a vehicle longitudinal axis. The central processing unit may be further configured to interface with at least one other vehicle system for an acceleration-based application. The at least one other vehicle system may include an airbag system, a rollover detection/mitigation system, a headlight beam leveling system, an active suspension system, and/or a traction control system.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions

As used in this description and the accompanying claims, the following terms shall have the meanings indicated, unless the context otherwise requires:

A "low-g" acceleration sensor typically measures accelerations under around 30 g and typically between around 1.2 g to 15 g.

A "high-g" acceleration sensor typically measures accelerations above around 30 g and typically between around 30 g to 500 g.

A "wide-g" or "wide dynamic g-range" acceleration sensor measures accelerations in both the low-g and high-g acceleration ranges.

Embodiments of the present invention employ wide-g satellite acceleration sensor modules that are capable of measuring horizontal and vertical acceleration in parallel to provide an integrated crash and vehicle movement solution suitable for low-cost application while meeting the fail-safe and redundancy levels needed for vehicle safety systems. The satellite sensor modules are typically configured to sense acceleration in at least one horizontal direction as well as to sense acceleration in the vertical direction. The horizontal sensor of such a satellite sensor module is typically a wide-g sensor and may include a wide-g sensor element or separate low-g and high-g sensor elements to allow for wide-g acceleration sensing. The vertical sensor of such a satellite sensor module is typically a low-g sensor including a low-g sensor element, although it may be a wide-g sensor including a wide-g sensor element or separate low-g and high-g sensor elements to allow for wide-g acceleration sensing. The horizontal and vertical sensors may be separate or may be integrated into a single sensor unit, such as a multi-axis (e.g., xz-axis, yz-axis, or xyz-axis) accelerometer.

Figure 1:
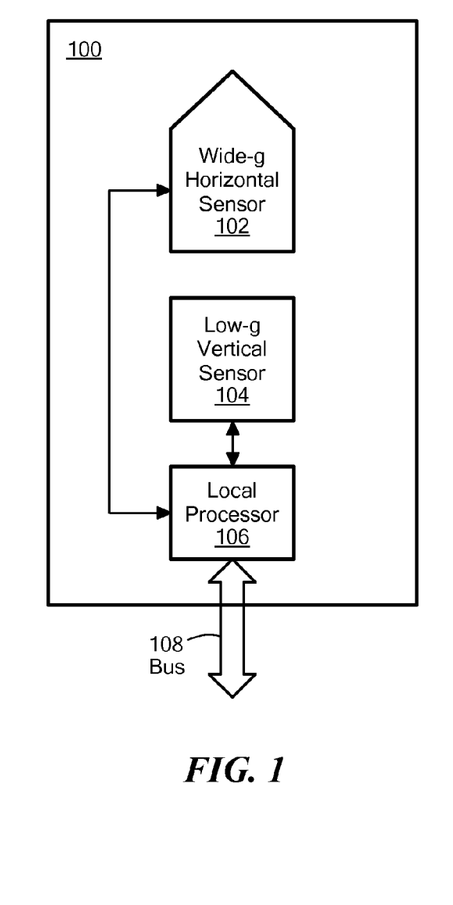
FIG. 1 is a schematic block diagram of a wide-g satellite sensor module in accordance with one exemplary embodiment.

FIG. 1 is a schematic block diagram of a wide-g satellite sensor module 100 in accordance with one exemplary embodiment. Among other things, the satellite sensor module 100 includes a wide-g horizontal sensor 102, a low-g vertical sensor 104, and a local processor 106 that is coupled to the sensor 102 and 104 and is couplable to a communication bus 108. The horizontal sensor 102 is configured for sensing accelerations along a predetermined axis of sensitivity, the direction of which is represented here by the pointed portion of the sensor 102. The local processor 106 performs local processing of signals generated by the sensors 102 and 104 and communicates with a central processing unit (not shown) over an appropriate communication interface (shown here as bus 108, which may be, for example, a PSI5 bus). It is expected that implementations of the satellite sensor module 100 often will be based on commonly used airbag satellite modules (e.g., modified versions of such airbag satellite modules in accordance with the present disclosure).

Figure 2A:
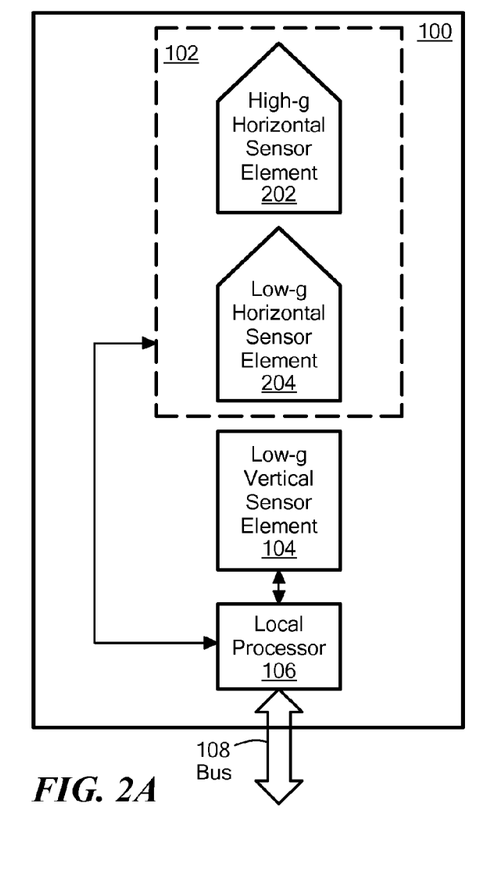
FIG. 2A is a schematic block diagram of a first exemplary satellite sensor module configuration in accordance with FIG. 1.
Figure 2B:
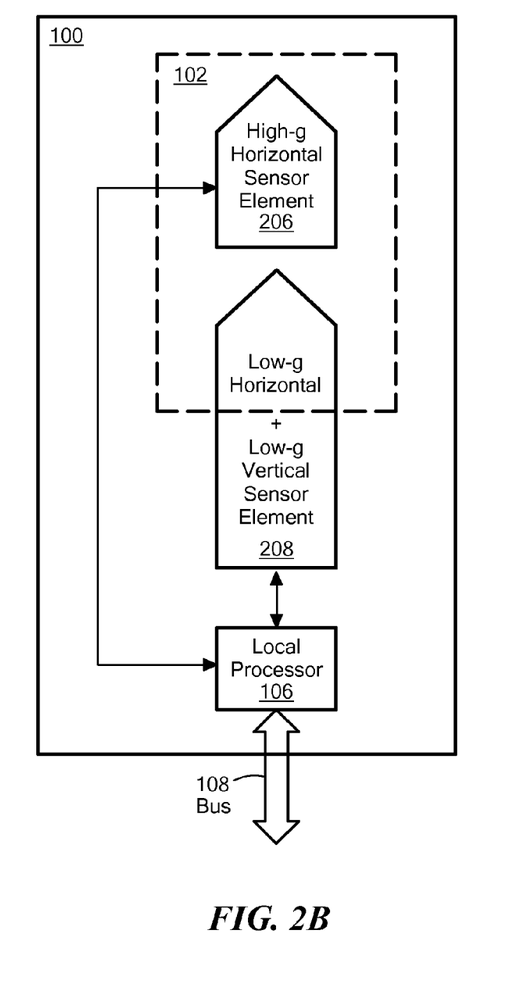
FIG. 2B is a schematic block diagram of a second exemplary satellite sensor module configuration in accordance with FIG. 1.

As discussed above, the horizontal sensor 102 may include a wide-g sensor element or separate low-g and high-g sensor elements to allow for wide-g acceleration sensing. FIG. 2A is a schematic block diagram of an exemplary satellite sensor module having separate high-g and low-g horizontal sensor elements 202 and 204 oriented for sensing along a common axis of sensitivity, where the dashed box around the high-g and low-g horizontal sensor elements logically represents the elements that combine to form the wide-g horizontal sensor 102. FIG. 2B is a schematic block diagram of an exemplary satellite sensor module having a high-g horizontal sensor element 206 and a sensor element 208 combining a low-g horizontal sensor element and a low-g vertical sensor element (e.g., a multi-axis low-g accelerometer) with the horizontal sensor elements oriented for sensing along a common axis of sensitivity, where the dashed box around the high-g and low-g horizontal sensor elements logically represents the elements that combine to form the wide-g horizontal sensor 102. It should be noted that the sensor elements shown in FIGS. 2A and 2B are exemplary, and other types and arrangements of sensor elements are possible.

In one specific embodiment, three specially-arranged wide-g satellite acceleration sensor modules are employed in a vehicle. Specifically, the three satellite sensor modules are placed within a vehicle to define a horizontal plane in accordance to the vehicle chassis, with a typical arrangement including two side satellite sensor modules placed toward the middle or rear of the vehicle opposing one another on opposite sides of the longitudinal center line of the vehicle and one front satellite placed toward the front of the vehicle, e.g., substantially along the center line of the vehicle. Such an arrangement is based on the mathematical minimum amount of points which define a plane (i.e., three points), with measurements from the various acceleration sensor allowing for detecting virtually any movement of the plane (e.g., translational and/or rotational movement).

Figure 3:
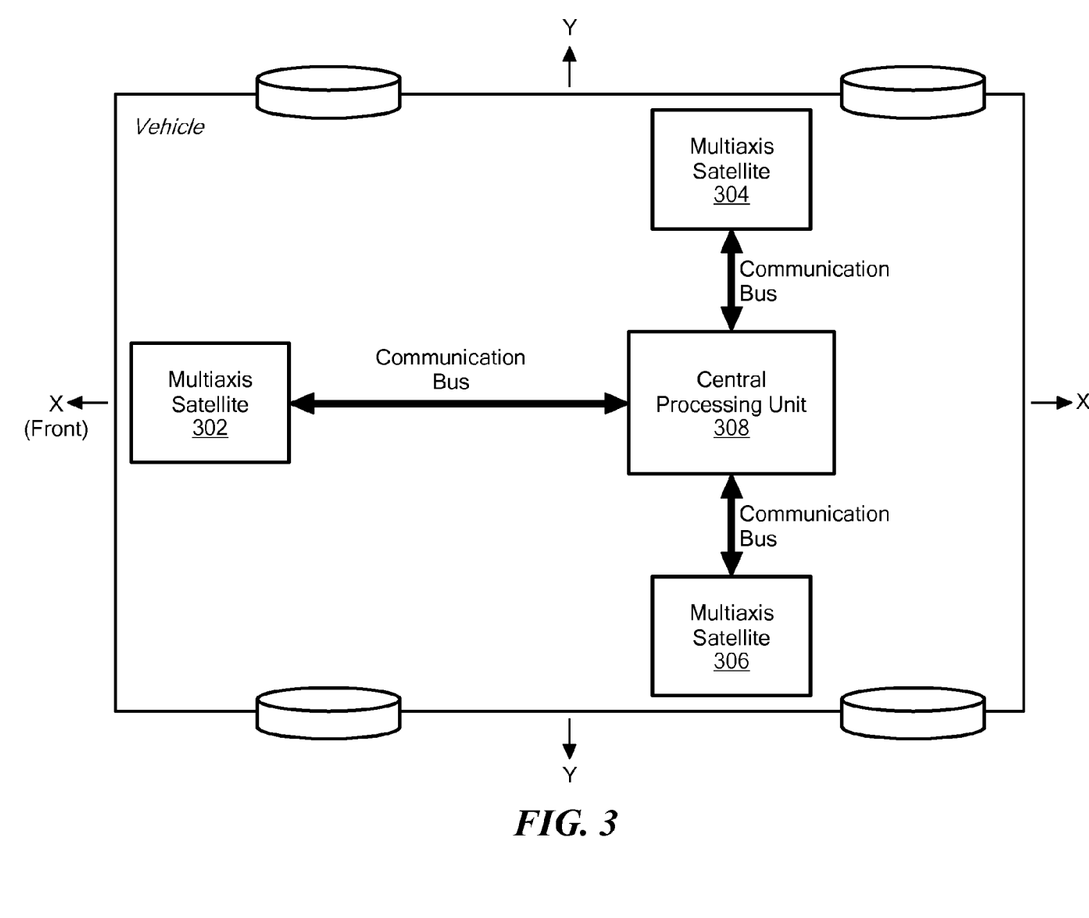
FIG. 3 is a schematic diagram showing relative placement of three satellite sensor modules in accordance with this exemplary embodiment.
Figure 4:
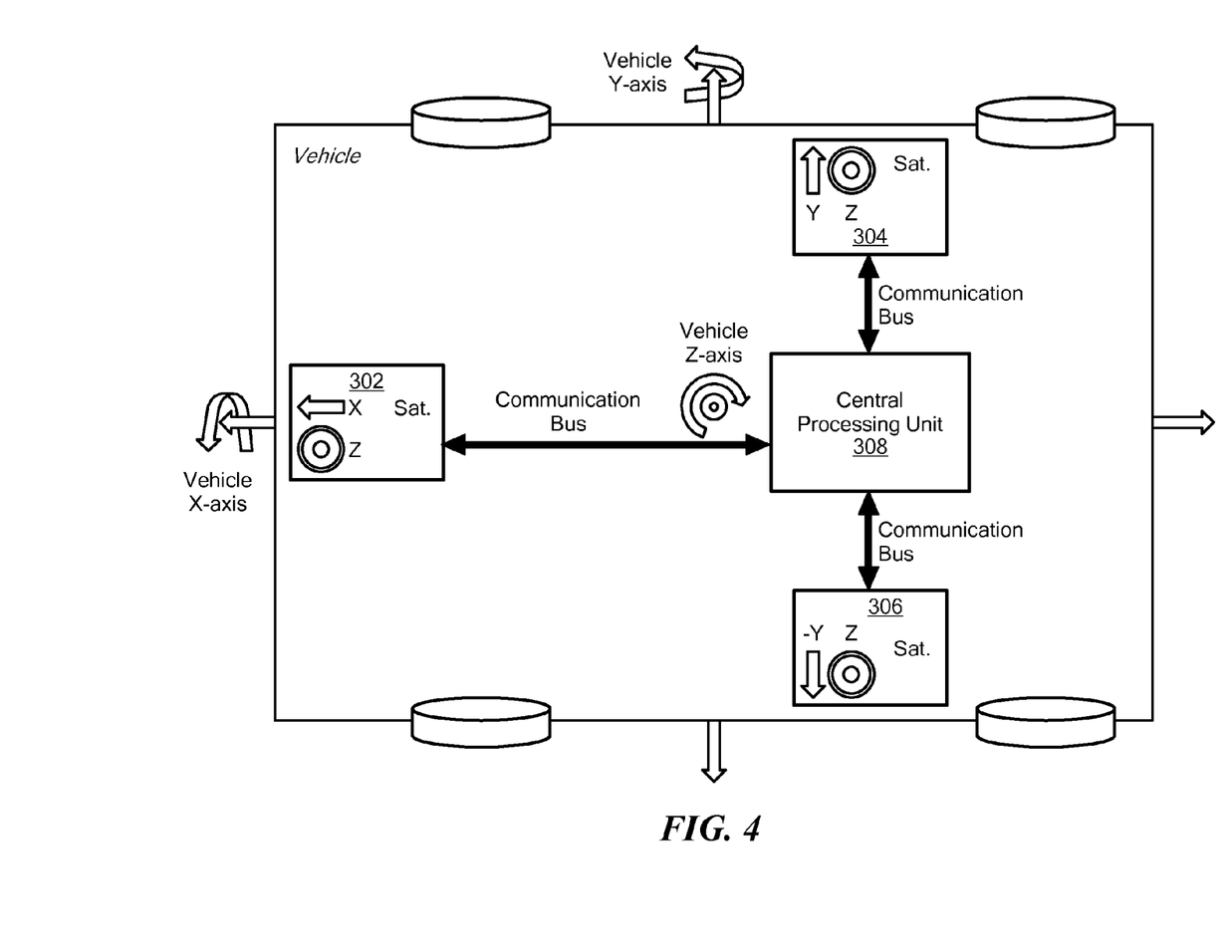
FIG. 4 is a schematic diagram showing the sense axes for the three satellite sensor modules shown in FIG. 3.

FIG. 3 is a schematic diagram showing relative placement of three satellite sensor modules in accordance with this exemplary embodiment, and FIG. 4 is a schematic diagram showing the sense axes for the three satellite sensor modules shown in FIG. 3. Specifically a front satellite sensor module 302 is placed toward the front of the vehicle and is oriented for sensing forward/backward horizontal acceleration (here designated as the x-axis), while side satellite sensor modules 304 and 306 are placed opposite one another off-line with the front satellite sensor module 302 and are oriented for sensing side-to-side horizontal acceleration (here designated as the y-axis). As discussed above, each of the satellite sensor modules also senses vertical acceleration (here designated as the z-axis), and each of the satellite sensor modules is in communication with a central processing unit 308, which collects and processes the acceleration information from the satellite sensor modules (which may be pre-processed by the local processors of the satellite sensor modules). The connections from the satellite sensor modules to the central processing unit 308 are shown here as separate connections, although a common bus (e.g., a TDM bus) may be used in some implementations.

Figure 5:
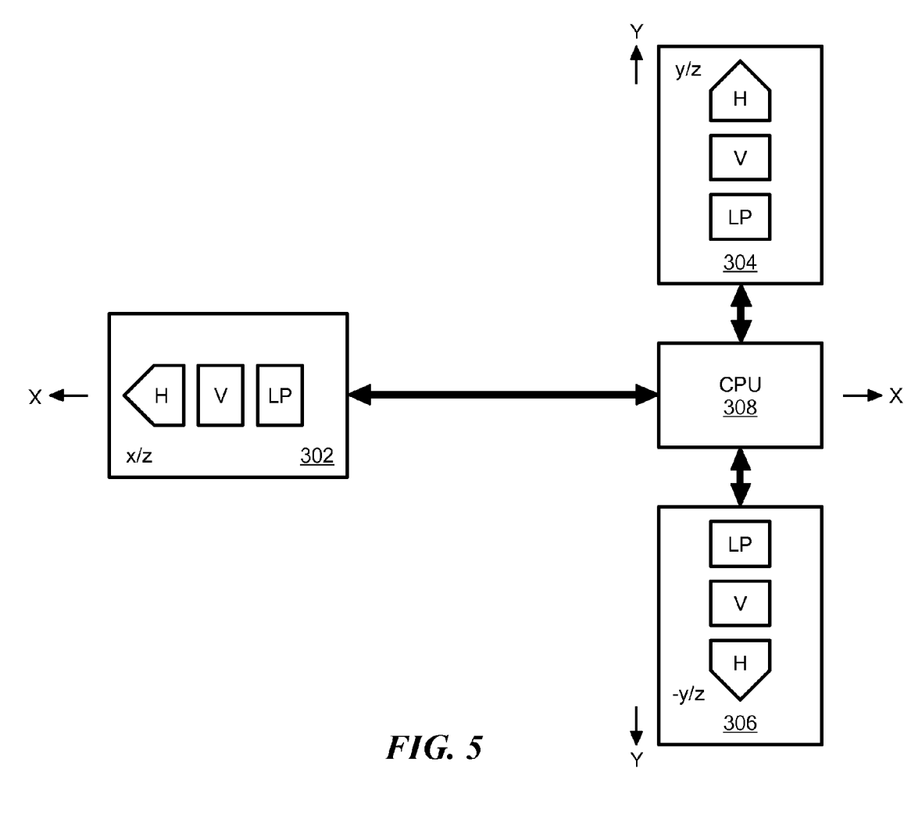
FIG. 5 is a schematic diagram showing an exemplary placement and orientation of satellite sensor modules in accordance with the arrangement shown in FIG. 4.

It should be noted that, in some embodiments, the three satellite sensor modules may be substantially identical and may be substantially of the type shown and described with reference to FIG. 1. FIG. 5 is a schematic diagram showing an exemplary placement and orientation of such satellite sensor modules in accordance with the arrangement shown in FIG. 4. Here, the front satellite sensor module 302 is oriented for sensing x and z axis accelerations, the side satellite sensor module 304 is oriented for sensing y and z axis accelerations, and the side satellite sensor module 306 is oriented for sensing −y and z axis accelerations.

The vertical acceleration measurements from the satellite sensor modules can be used individually and/or collectively to determine tilt or dynamic roll/pitch movement of the vehicle, which then can be used for functions such as rollover and/or pitch detection (e.g., using well-known algorithms for rollover and pitch detection), head light beam leveling, active suspension, or other functions or applications involving information about vertical movement and tilt of the vehicle. For example, the measurement of the z-axis acceleration of the front satellite sensor module can be used to determine an accelerated rotational movement around the vehicle y-axis such as accelerated pitch movement or vehicle titling to front or rear, while the measurement of the z-axis acceleration of the side satellite sensor modules can be used to determine any accelerated rotational movement around the vehicle x-axis such as accelerated roll movement or vehicle titling to a side. Similarly, the measurements of the z-axis accelerations from the three satellite sensor modules can be used to determine an upward or downward shift of the entire vehicle, e.g., a level drop of the vehicle.

The horizontal acceleration measurements can be used to determine any accelerated or decelerated movement of the vehicle in the x and/or y direction such as a crash event (e.g., using well established airbag crash detection algorithms) or other accelerated horizontal vehicle movement (e.g., skidding), which then can be used for functions such as crash sensing for airbag deployment, traction control, or other functions or applications involving information about the horizontal movement of the vehicle. Similarly, the horizontal acceleration measurements can be used to determine accelerated rotational movement of the vehicle about the z-axis (i.e., yaw) such as a spin-out, which then can be used for function such as traction control, automated braking, or other functions or applications involving information about the rotational movement of the vehicle. In addition, horizontal acceleration information may be used to improve the tilt measurement done by acceleration sensing in z-axis direction, e.g., certain tilt or roll events will generate accelerations in the z-axis as well as in the x-axis and/or y-axis.

In various alternative embodiments, one or more of the satellite sensing modules includes an additional wide-g horizontal sensor, enabling such satellite sensor module(s) to measure acceleration in the x, y, and z axes. Among other things, such additional acceleration-sensing capabilities allow for additional and/or improved vehicle movement sensing and also provides for redundancy/robustness.

Figure 6:
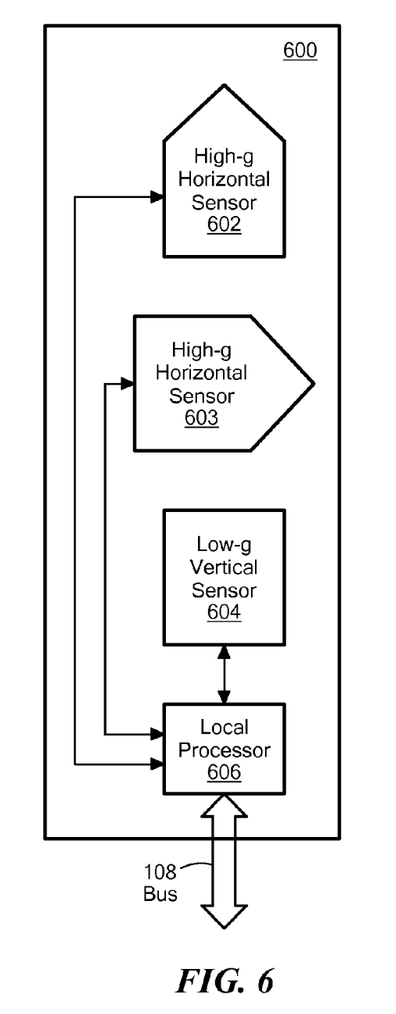
FIG. 6 is a schematic block diagram of a wide-g satellite sensor module in accordance with an alternative exemplary embodiment.

FIG. 6 is a schematic block diagram of a wide-g satellite sensor module 600 in accordance with one exemplary embodiment. Among other things, the satellite sensor module 600 includes a first wide-g horizontal sensor 602, a second wide-g horizontal sensor 603, a low-g vertical sensor 604, and a local processor 606 that is coupled to the sensors 602, 603, and 604 and is couplable to a communication bus 108. The horizontal sensors 602 and 604 are configured for sensing accelerations along two axes of sensitivity that are normal to one another (e.g., x and y axes). The local processor 606 performs local processing of signals generated by the sensors 602, 603, and 604 and communicates with the central processing unit (not shown) over an appropriate communication interface (shown here as bus 108, which may be, for example, a PSI5 bus). It is expected that implementations of the satellite sensor module 600 often will be based on commonly used airbag satellite modules (e.g., modified versions of such airbag satellite modules in accordance with the present disclosure).

Figure 7A:
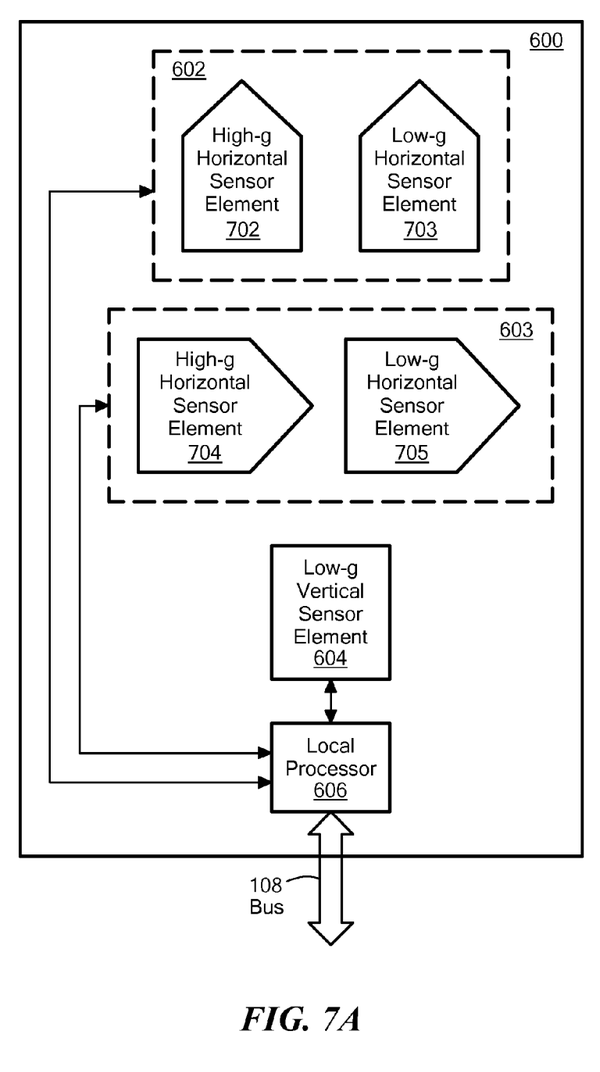
FIG. 7A is a schematic block diagram of a first exemplary satellite sensor module in accordance with FIG. 6.
Figure 7B:
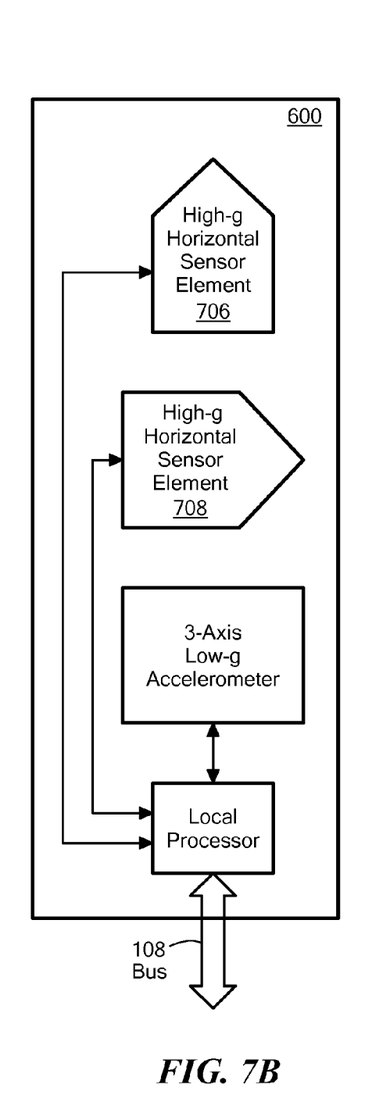
FIG. 7B is a schematic block diagram of a second exemplary satellite sensor module in accordance with FIG. 6.

FIG. 7A is a schematic block diagram of an exemplary satellite sensor module having separate high-g and low-g horizontal sensor elements for each of the two axes of sensitivity, specifically sensor elements 702 and 703 (locally representing the wide-g horizontal sensor 602) oriented for one axis and sensor elements 704 and 705 (locally representing the wide-g horizontal sensor 603) oriented for the other axis. FIG. 7B is a schematic block diagram of an exemplary satellite sensor module having separate high-g horizontal sensor elements 706 and 708 and a sensor element 710 combining three low-g sensor elements for the x, y, and z axes (e.g., a three-axis low-g accelerometer). It should be noted that the sensor elements shown in FIGS. 7A and 7B are exemplary, and other types and arrangements of sensor elements are possible.

Figure 8:
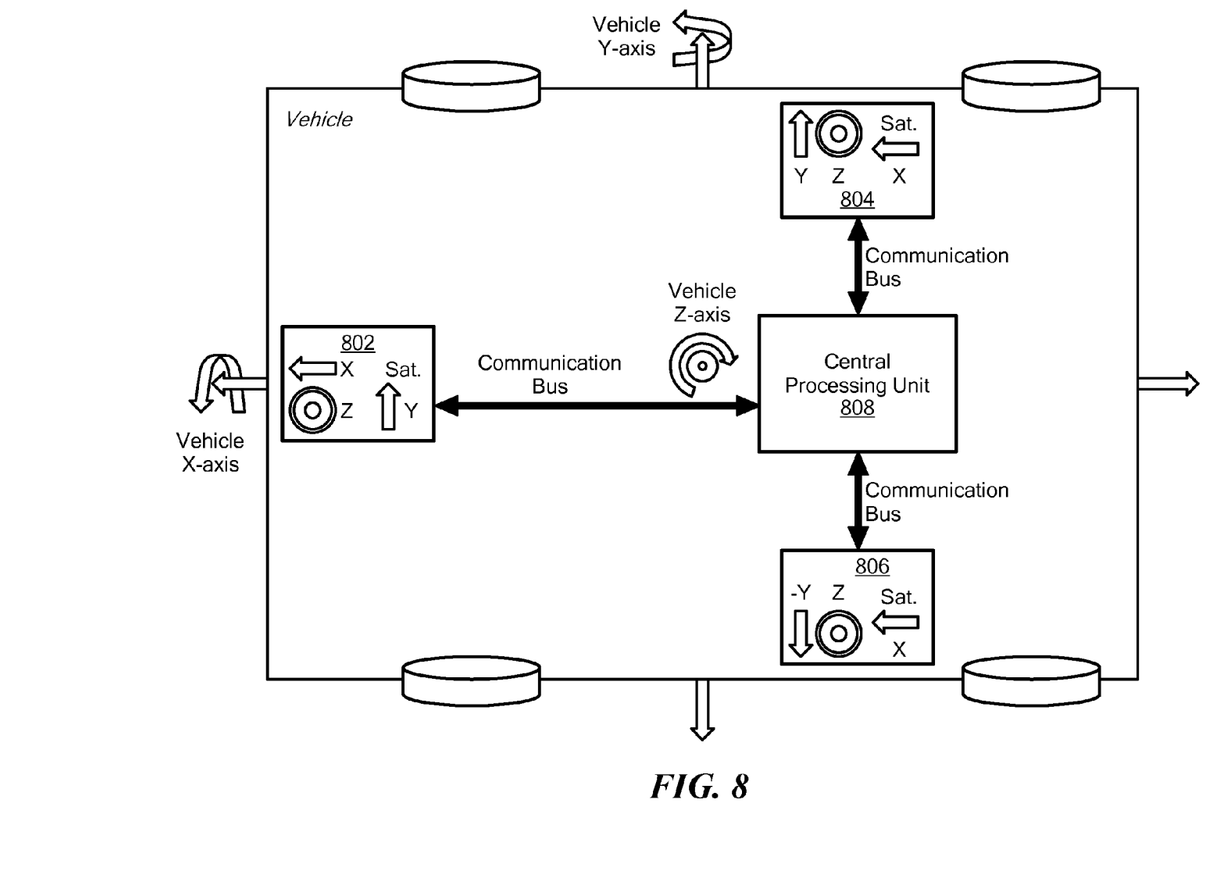
FIG. 8 is a schematic diagram showing the sense axes for the three satellite sensor modules in accordance with the alternative embodiment of FIG. 6.

FIG. 8 is a schematic diagram showing the sense axes for the three satellite sensor modules in accordance with an alternative embodiment. Specifically a front satellite sensor module 802 is placed toward the front of the vehicle, while side satellite sensor modules 804 and 806 are placed opposite one another off-line with the front satellite sensor module 802. Each of the satellite sensor modules is in communication with a central processing unit 808, which collects and processes the acceleration information from the satellite sensor modules (which may be pre-processed by the local processors of the satellite sensor modules). The connections from the satellite sensor modules to the central processing unit 808 are shown here as separate connections, although a common bus (e.g., a TDM bus) may be used in some implementations.

It should be noted that, in some embodiments, the three satellite sensor modules may be substantially identical and may be substantially of the type shown and described with reference to FIG. 6.

Among other things, such three-axis satellite sensor modules improve the ability to sense rotation about the z-axis. Specifically, rotation about the z-axis will be reflected in the y-axis sensor of a three-axis front satellite sensor module as well as in the x-axis sensors of a three-axis side satellite sensor module.

It should be noted that any of a variety of acceleration-based applications may be integrated into the central processing unit based on the (typically pre-processed) acceleration information received from the satellite sensor modules and possibly information from other sources/sensors in the vehicle. Such acceleration-based applications may include (without limitation) such things as crash detection/mitigation using well established airbag crash detection algorithms, rollover detection/mitigation using well-known rollover and pitch detection algorithms, headlight beam leveling, active suspension control, and/or traction control. Additionally or alternatively, the central processing unit can share acceleration information or other information (e.g., "raw" acceleration information received from the satellite sensor modules and/or information generated by the central processing unit based on the acceleration information received from the satellite sensor modules and possibly information other sources/sensors in the vehicle) with other systems in the vehicle that perform such applications.

It should be noted that a reduced system having only two satellite acceleration sensor modules may be used together with the central processing unit if less-complete vehicle movement information is needed, for example, only a movement in one horizontal direction plus tilt sensing around either the vehicle x or y axis.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A satellite sensor module for a vehicle sensor system, the satellite sensor module comprising:
   a first wide-g horizontal acceleration sensor arranged for sensing accelerations for a first horizontal vehicle axis;
   a vertical acceleration sensor arranged for sensing accelerations for a vertical vehicle axis; and
   a local processor in communication with the sensors, the local processor configured to process acceleration information received from the sensor for at least one of vehicle crash, roll, pitch, or yaw detection.

2. A satellite sensor module according to claim 1, wherein the first wide-g horizontal acceleration sensor comprises separate high-g and low-g horizontal acceleration sensor elements.

3. A satellite sensor module according to claim 1, wherein the first wide-g horizontal acceleration sensor and the vertical acceleration sensor comprises a high-g horizontal acceleration sensor element and a combination low-g horizontal and vertical acceleration sensor element.

4. A satellite sensor module according to claim 1, further comprising a second wide-g horizontal acceleration sensor in communication with the local processor and arranged for sensing accelerations for a second horizontal vehicle axis normal to the first horizontal vehicle axis.

5. A satellite sensor module according to claim 4, wherein the first wide-g horizontal acceleration sensor comprises separate high-g and low-g horizontal acceleration sensor elements, and wherein the second wide-g horizontal acceleration sensor comprises separate high-g and low-g horizontal acceleration sensor elements.

6. A satellite sensor module according to claim 4, wherein the first and second wide-g horizontal acceleration sensors and the vertical acceleration sensor comprises:
   a first high-g horizontal acceleration sensor element arranged for sensing accelerations for the first horizontal vehicle axis;
   a second high-g horizontal acceleration sensor element arranged for sensing accelerations for the second horizontal vehicle axis; and
   a three-axis low-g acceleration sensor element arranged for sensing accelerations for the first horizontal vehicle axis, the second horizontal vehicle axis, and the vertical axis.

7. A vehicle sensor system comprising:
   a front satellite sensor module including a wide-g horizontal acceleration sensor and a vertical acceleration sensor, the wide-g horizontal acceleration sensor arranged for sensing accelerations for a vehicle longitudinal axis;
   a first side satellite sensor module including a wide-g horizontal acceleration sensor and a vertical acceleration sensor, the wide-g horizontal acceleration sensor arranged for sensing accelerations for a vehicle lateral axis;
   a second side satellite sensor module including a wide-g horizontal acceleration sensor and a vertical acceleration sensor, the wide-g horizontal acceleration sensor arranged for sensing accelerations for the vehicle lateral axis; and
   a central processing unit in communication with the satellite sensor modules, the central processing unit configured to process acceleration information received from the satellite sensor modules for at least one of vehicle crash, roll, pitch, or yaw detection.

8. A vehicle sensor system according to claim 7, wherein the front satellite sensor module further comprises a second wide-g horizontal acceleration sensor arranged for sensing accelerations for a vehicle lateral axis.

9. A vehicle sensor system according to claim 7, wherein each side satellite sensor module includes a second wide-g horizontal acceleration sensor arranged for sensing accelerations for a vehicle longitudinal axis.

10. A vehicle comprising:
   a front satellite sensor module including a wide-g horizontal acceleration sensor and a vertical acceleration sensor, the wide-g horizontal acceleration sensor arranged for sensing accelerations for a vehicle longitudinal axis;
   a first side satellite sensor module including a wide-g horizontal acceleration sensor and a vertical acceleration sensor, the wide-g horizontal acceleration sensor arranged for sensing accelerations for a vehicle lateral axis;
   a second side satellite sensor module including a wide-g horizontal acceleration sensor and a vertical acceleration sensor, the wide-g horizontal acceleration sensor arranged for sensing accelerations for the vehicle lateral axis; and a central processing unit in communication with the satellite sensor modules, the central processing unit configured to process acceleration information received from the satellite sensor modules for at least one of vehicle crash, roll, pitch, or yaw detection, wherein:

the front satellite sensor module is placed toward the front of the vehicle; and the side satellite sensor modules are placed opposite one another behind the front satellite sensor module and on opposite sides of the vehicle longitudinal axis.

11. A vehicle according to claim 10, wherein the front satellite sensor module further comprises a second wide-g horizontal acceleration sensor arranged for sensing accelerations for a vehicle lateral axis.

12. A vehicle according to claim 10, wherein each side satellite sensor module includes a second wide-g horizontal acceleration sensor arranged for sensing accelerations for a vehicle longitudinal axis.

13. A vehicle according to claim 10, wherein the central processing unit is further configured to interface with at least one other vehicle system for an acceleration-based application.

14. A vehicle according to claim 13, wherein the at least one other vehicle system includes an airbag system.

15. A vehicle according to claim 13, wherein the at least one other vehicle system includes a rollover detection/mitigation system.

16. A vehicle according to claim 13, wherein the at least one other vehicle system includes a headlight beam leveling system.

17. A vehicle according to claim 13, wherein the at least one other vehicle system includes an active suspension system.

18. A vehicle according to claim 13, wherein the at least one other vehicle system includes a traction control system.

* * * * *